United States Patent
Hultström et al.

(10) Patent No.: US 12,494,223 B2
(45) Date of Patent: Dec. 9, 2025

(54) ARTIFICIAL INTELLIGENCE (AI) BASED GARBLED SPEECH ELIMINATION

(71) Applicant: Telefonaktiebolaget LM Ericsson (publ), Stockholm (SE)

(72) Inventors: Maria Hultström, Stockholm (SE); Johan Bertenstam, Huddinge (SE); Thomas Öhlen, Skärholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 17/914,073

(22) PCT Filed: Mar. 31, 2020

(86) PCT No.: PCT/SE2020/050332
§ 371 (c)(1),
(2) Date: Sep. 23, 2022

(87) PCT Pub. No.: WO2021/201732
PCT Pub. Date: Oct. 7, 2021

(65) Prior Publication Data
US 2023/0119042 A1    Apr. 20, 2023

(51) Int. Cl.
*G10L 25/60*    (2013.01)
*G10L 25/27*    (2013.01)
*H04L 9/06*    (2006.01)

(52) U.S. Cl.
CPC .............. *G10L 25/60* (2013.01); *G10L 25/27* (2013.01); *H04L 9/065* (2013.01)

(58) Field of Classification Search
None
See application file for complete search history.

(56) References Cited

U.S. PATENT DOCUMENTS

| | | | |
|---|---|---|---|
| 3,959,592 A | * | 5/1976 | Ehrat ............ H04K 1/00 380/275 |
| 7,043,022 B1 | | 5/2006 | Blanchard et al. |

(Continued)

FOREIGN PATENT DOCUMENTS

| | | |
|---|---|---|
| CN | 110 602 432 A | 12/2019 |
| WO | 2009/074711 A1 | 6/2009 |
| WO | 2019/213021 A1 | 11/2019 |

OTHER PUBLICATIONS

International Search Report and Written Opinion dated Feb. 11, 2021 in International Application No. PCT/SE2020/050332 (10 pages).

(Continued)

*Primary Examiner* — Quynh H Nguyen
(74) *Attorney, Agent, or Firm* — Rothwell, Figg, Ernst & Manbeck, P.C.

(57) ABSTRACT

An AI-based approach to Garbled speech (GS) detection. Machine learning (ML) models are created that can distinguish between GS speech and non-GS speech with high accuracy. The machine learning models take as input an encoded speech frame that has passed a CRC check. The input data/predictors to the models are a selected set of information elements (IEs) (i.e., a set of one or more bits) of the encoded speech frame. The selected IEs are a part of the input parameters to the speech decoder. It is possible to operate on single encoded speech frames, in contrast to using decoded frames, which requires taking a previous encoded frame into account for being able to perform the decoding.

20 Claims, 8 Drawing Sheets

(56) References Cited

U.S. PATENT DOCUMENTS

| | | | |
|---|---|---|---|
| 2006/0053352 A1 | 3/2006 | Juncker | |
| 2015/0023504 A1 | 1/2015 | Wix et al. | |
| 2016/0066203 A1 | 3/2016 | Yoon | |
| 2016/0248908 A1* | 8/2016 | Kanamarlapudi | H04M 3/2227 |
| 2019/0348065 A1* | 11/2019 | Talwar | G10L 25/78 |
| 2021/0056350 A1* | 2/2021 | Curewitz | G06F 13/161 |

OTHER PUBLICATIONS

3GPP TS 26.101 V15.0.0, Technical Specification, 3rd Generation Partnership Project; Technical Specification Group Services and System Aspects; Mandatory speech codec speech processing functions; Adaptive Multi-Rate (AMR) speech codec frame structure (Release 15), Jun. 2018 (20 pages).

3GPP TS 26.201 V15.0.0, Technical Specification, 3rd Generation Partnership Project; Technical Specification Group Services and System Aspects; Speech codec speech processing functions; Adaptive Multi-Rate—Wideband (AMR-WB) speech codec; Frame structure (Release 15), Jun. 2018 (23 pages).

3GPP TS 26.090 V15.0.0, Technical Specification, 3rd Generation Partnership Project; Technical Specification Group Services and System Aspects; Mandatory Speech Codec speech processing functions; Adaptive Multi-Rate (AMR) speech codec; Transcoding functions (Release 15), Jun. 2018 (56 pages).

3GPP TS 26.190 V15.0.0, Technical Specification, 3rd Generation Partnership Project; Technical Specification Group Services and System Aspects; Speech codec speech processing functions; Adaptive Multi-Rate—Wideband (AMR-WB) speech codec; Transcoding functions (Release 15), Jun. 2018 (51 pages).

3GPP TS 25.331 V15.4.0, Technical Specification, 3rd Generation Partnership Project; Technical Specification Group Radio Access Network; Radio Resource Control (RRC); Protocol specification (Release 15), Sep. 2018 (2318 pages).

* cited by examiner

ARTIFICIAL INTELLIGENCE (AI) BASED GARBLED SPEECH ELIMINATION

CROSS REFERENCE TO RELATED APPLICATIONS

This application is a 35 U.S.C. § 371 National Stage of International Patent Application No. PCT/SE2020/050332, filed Mar. 31, 2020.

TECHNICAL FIELD

Disclosed are embodiments related to eliminating Garbled speech.

BACKGROUND

Mobile communication networks (e.g., 2G, 3G, Long Term Evolution (LTE), 5G) are used to transport voice-data (e.g., a voice call) and non-voice-data to and from a user equipment (UE). When a user of a UE is using the mobile communication network to send voice-data to a recipient, the UE will transmit speech frames (e.g., frames containing data derived from the user's utterances) to a radio access network (RAN) node (e.g., base station or radio network controller). This is referred to as an uplink (UL) transmission. Typically, the speech frame contains encoded and ciphered voice-data. That is, for example, the UE receives an audio signal corresponding to the user's utterance, encodes the audio signal to produce encoded voice-data, then ciphers (i.e., encrypts) the encoded data using a cipher parameter to produce ciphered encoded data, and then transmits to the network node a speech frame containing the ciphered data.

When the network node receives the speech frame, the network node uses a corresponding cipher parameter to de-cypher the cyphered data to thereby obtain the encoded voice-data and forwards the encoded voice-data onward to the intended recipient.

"Garbled speech" is a well-known problem that occurs when there is a mismatch between a ciphering parameter used by the UE to cipher the encoded voice-data and the corresponding ciphering parameter used by the network node to decipher the encoded voice-data, thereby causing a random disorder of the bits.

Garbled speech (GS) is a problem for many mobile communication networks, including 2G, 3G, 4G and 5G networks, but the consequence is typically different. In 2G/3G networks the GS causes the circuit switched (CS) voice to become incomprehensible and the GS is audible to the intended recipient, whereas in both 4G and 5G networks the packet switched (PS) voice typically becomes silent and after a while the call drops. Also, for 4G/5G the voice might become incomprehensible to the end-users if robust header compression (ROCH) is not being used.

While GS does not happen very often (typically less than 1% of all the voice calls), it can have a severe impact when it occurs. In addition, it is difficult for the network to detect the existence of garbled data and determine its root cause.

GS is most commonly occurring both in the UL and the downlink (DL) at the same time, as predominantly the mismatch occurs both for UL and DL. GS can only be resolved in the side where it was caused in the UL, as a RAN detected GS in the DL input emanates from the other side.

In some instances, GS may potentially resolve itself by triggering a reset of the ciphering parameters, which occurs if the call is re-established or a handover (Inter-frequency or an inter-Radio Access Technology (IRAT) handover) occurs during the call. Nevertheless, GS remains a problem.

International patent publication WO2019/213021 A1 describes using a machine leaning model to detect a lost speech frame. The machine learning model is used to detect abnormalities between speech frames due to the missing content. The publication also discloses the possibility to generate a new speech frame to replace the one that is missing to thereby improve the speech quality. The publication, however, does not address any problems created by GS.

SUMMARY

A general problem associated with trying to correct GS is the possibility of false detections. Correcting a false detection will either cause an introduction of GS or alternatively cause other disadvantages, impacting the performance.

To overcome the false detection problem, this disclosure provides an Artificial Intelligence (AI)-based approach for GS detection. In the AI-based approach, machine learning models are created that can distinguish between GS speech and non-GS speech with high accuracy. In one embodiment, the machine learning models take as input an encoded speech frame that has passed a cyclic redundancy check (CRC) check. The input data/predictors to the models are a selected set of information elements (IEs) (i.e., a set of one or more bits) of the encoded speech frame. The selected IEs are a part of the input parameters to the speech decoder. It is possible to operate on single encoded speech frames, in contrast to using decoded frames, which requires taking a previous encoded frame into account for being able to perform the decoding. The predictors have been selected after building several models using different sets of predictors, with the aim to reduce the number of predictors whilst maintaining a high prediction performance and at the same time limiting the size of the model. The models only rely on active speech frames and do not require Silence Descriptor (SID) frames to be generated. The machine learning (ML) models operate on just one single speech frame, which has been proven to be good enough and reduces the complexity compared to requiring several consecutive frames.

The ML models may be created using off-line training. The ML models can be based on, for example, Random Forest or Neural Network. Both GS and non-GS of the same audio is generated and used for model training and verification. To obtain representative speech, one can use a library with hours of different audio for speech recognition and/or use a crowdsourcing approach where different phone calls are recorded. The detection rate is around 90-95% for both garbled and non-garbled. In one embodiment, off-line training has been used to develop a first model for a first Adaptive Multi-Rate (AMR) codec (AMR Narrow Band (NB)) and a first model for a second AMR codec (AMR wideband (WB)).

In one embodiment, to limit the possibility of false detection the GS detector is activated only at initial setup of voice and at reset of the ciphering parameters for voice, also the models will run for a limited time. In one embodiment, two types of correction mechanism are applied: 1) Hyper Frame Number (HFN) correction, and 2) a procedure to reset the ciphering input parameters (e.g., a Call Re-Establishment (CRE) procedure or other procedure to reset the ciphering input parameters). The HFN is used to limit the sequence numbering over the air interface between the UE and RAN and is input to the ciphering unit.

Accordingly, in one aspect there is provided a method for processing at least one speech frame (for example, an encoded speech frame). The method is performed by a network node and comprises receiving a first ciphered speech frame comprising first voice-data. The method also comprises deciphering the first ciphered speech frame using a first deciphering parameter, thereby obtaining a first deciphered speech frame comprising the first voice-data, wherein the first deciphered speech frame comprises a set of information elements (IEs) wherein each IE consists of a set of one or more bits. The method also comprises inputting a subset of the set of IEs of the first deciphered speech frame into a trained machine learning, ML, model. And the method also comprises obtaining from the ML model a first GS indicator, wherein the first GS indicator indicates either i) that the ML model has detected GS based on the subset of IEs of the first deciphered speech frame or ii) that the ML model has not detected GS based on the subset of IEs of the first deciphered speech frame.

In another aspect there is provided a network node that is adapted to perform the above described method. In one embodiment, the network node comprises a storage unit and processing circuitry. In embodiment the storage unit comprises memory that stores instructions for configuring the network node to perform the method.

In another aspect there is provided a computer program comprising instructions which, when executed by processing circuitry, cause the processing circuitry to perform the method. In one embodiment, a carrier contains the computer program, wherein the carrier is one of an electronic signal, an optical signal, a radio signal, or a computer readable storage medium.

The aspects and embodiments disclosed herein provide several advantages. For example, the embodiments will detect most of the GS occurring after a start/reset of the ciphering parameters for voice, with only a small number of false detections. Also, the detection is quick. Typically, the delay until a GS is detected and corrected is between 120 ms and about 2 second. This allows for the call to be corrected before the end user hangs up. Other advantages include: no negative impact on performance, no specific new (costly) HW required, and the embodiments can handle all types of fault and un-limited HFN discrepancy. Another advantage is that some embodiments detect GS using encoded speech frames so that decoding of the encoded speech frames is not necessary to detect GS.

BRIEF DESCRIPTION OF THE DRAWINGS

The accompanying drawings, which are incorporated herein and form part of the specification, illustrate various embodiments.

DETAILED DESCRIPTION

Figure 1:
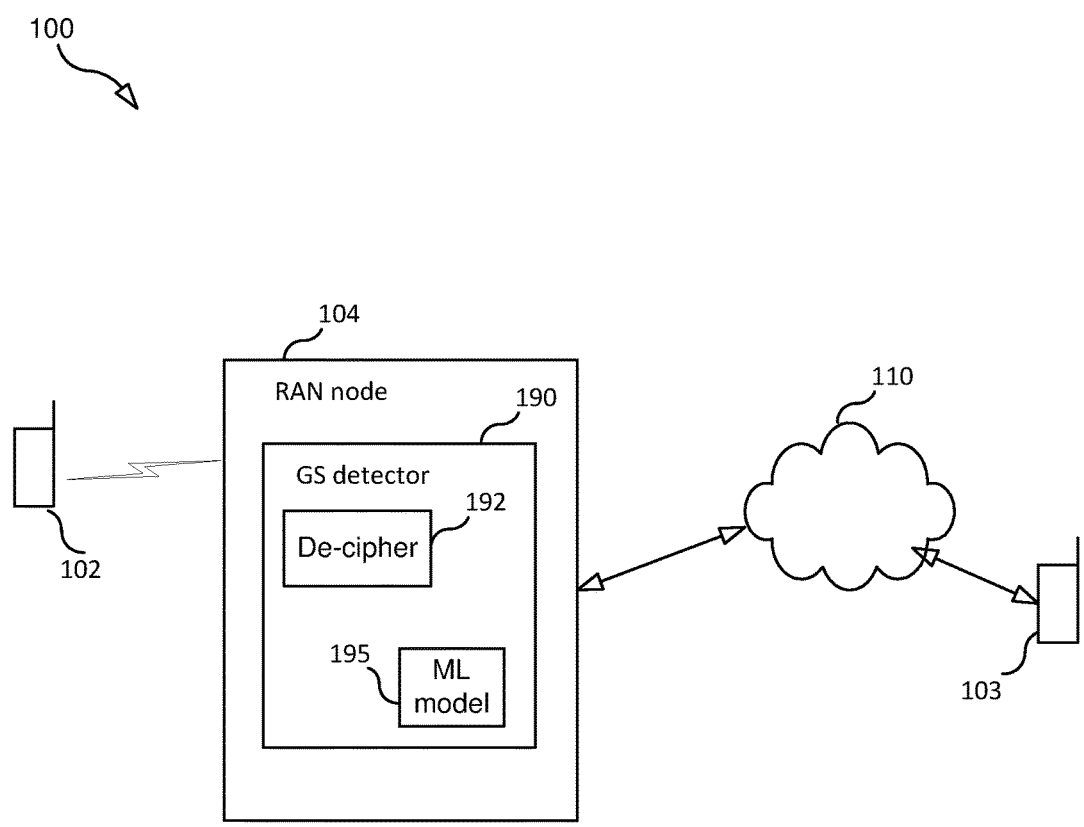
FIG. 1 illustrates a communication system according to some embodiments.

As noted in the background section, GS is a well-known problem. In a 3G network, GS may be caused by a long UL layer-3 (L3) delay, which occurs at call setup or reconfiguration. The long UL L3 delay (e.g., >2.56 seconds) may cause an input ciphering parameter, such as a counter (e.g., the "count-c" counter), to be out-of-sync between the UE and the RAN. In the UL L3 acknowledgement (ACK) message sent by the UE, the UE will signal the time when both the UE and RAN shall start to step the last four bits of the HFN, which is a part of the count-c parameter. The UE which is directly aware of the time given, will after that time has passed start stepping the HFN value when the Connection Frame Number (CFN) wraps-around (i.e. goes from 255 to 0). If the L3 UL ACK message is delayed, then the UE may start stepping the HFN value before RAN does. It is possible that several CFN wrap-arounds occur before RAN is receiving the L3 UL ACK. GS may also be caused by UE and/or RAN faults, possibly related to other input parameters than the count-c or HFN.

One option for combating GS is to measure the round-trip time (RTT) and trigger a Call Re-establishment if the RTT is greater than a threshold (e.g., 2.56 seconds). GS is only introduced by the RRC UL delay at setup/reconfiguration of the voice bearer. Hence, measuring the RTT can only provide a risk indication. The likelihood for false detections with this approach is high and moreover only the Third-Generation Partnership Project (3GPP) induced risk is possible to target. To limit the number of false detections a high threshold value (>>2.56 s) may be used, but it is at the same time also limiting the number of GS that can be corrected. Applying Call Re-establishment, which resets the ciphering parameters, may itself cause GS if the UL delay becomes too long. Additionally, there is the risk of losing the call, which at setup will cause accessibility failures, and at reconfiguration will cause an increase in drop rate and a speech interruption. For a real GS call the drawbacks may be acceptable, but the high likelihood for false detections with this approach will reduce the performance more than just ignoring the small percentage of (GS) calls that exist.

Another option is to check the bits of the SID frames that are sent during periods of silence. If the bits are "faulty," then the RAN can take action by changing the HFN values. For example, with respect to AMR NB/WB, AMR NB/WB SID frames contain information about which codec rate that the UE would have used in case a true speech frame would have been transmitted at that time (i.e. an indication of the transmit power of the UE) (see reference [1] and reference [2]). In case an invalid codec rate is indicated and the frame as passed the CRC test, then GS can be considered detected with a high likelihood.

The main problem with this approach that a large number of UE do not comply to the 3GPP standard and use values that will cause a high probability for false detection. This is to some extent caused by a change in bit ordering (least significant bit (LSB) instead of most significant bit (MSB)) for the codec rates for AMR NB and for AMR WB, but the main problem is that many chipset implementations do not comply to the 3GPP standard based on that these specific bits has no strict meaning. This approach is therefore non-robust and will, with high likelihood, introduce GS when a new HFN value is attempted. Moreover, even for those UEs which are 3GPP standard compliant, this approach is limited to work only on UE identified periods of silence, which will infer a delay in the detection and in addition rely on the capability for chipset to detect silent periods, which some chipset have a problem with.

Yet another option is to decode the encoded voice data contained in the speech frames (e.g., in the UE but also in RAN) using an AMR NB/WB Vocoder and check ranges and/or common pattern for voice. Change the input parameters to the deciphering and let the algorithm continue to run. The input parameters are changed according to the most common scenarios and at last returning to their initial values (to handle false detections). A problem with this approach is that applying a Vocoder to decode the frame consumes processing resources, typically requires dedicated hardware, and introduces an additional delay in the speech path. In order to decode an AMR NB/WB speech frame the previous speech frame is also required. Due to the negative performance impact, the algorithm needs to be restricted to only run for a certain time. By analyzing several frames, an algorithm which has a low probability of detecting false positives could be created at a cost of the delay and load. However, the correction applied can only be guessed—as to confirm that the correction fulfills the criteria for the range check or speech property would require a new speech decoding operation, which would double the already added delay and load. Thus, confirming the correction cannot be afforded. Hence, the approach will have limited possibility to really correct the GS and for false detections GS would be introduced. To solve the problem with the very low GS population versus a (low) probability for a false detection, the final attempt is just to restore the ciphering parameters to the ones they originally had in the beginning. This approach only works for HFN corrections, typically related to L3 delay.

Referring now to FIG. 1, FIG. 1 illustrates a communication system 100 according to an embodiment. As illustrated in FIG. 1, communication system 100 includes a first UE 102 having a voice call with a second UE 103, where the first UE 102 is served by a first network node 104. When network node 104 is part of a 3G RAN, network node 104 may comprise a radio-network controller RNC, for 2G systems network node 104 may comprise a base station controller (BCS), for 4G systems network node 104 may comprise a 4G base station (evolved NodeB (eNB)), and for 5G system network node 104 may comprise a 5G base station (gNB) or a Packet Processing Function (PPF) (e.g., in the PDCP (Packet Data Convergence Protocol) layer) for split architectures.

Figure 2:
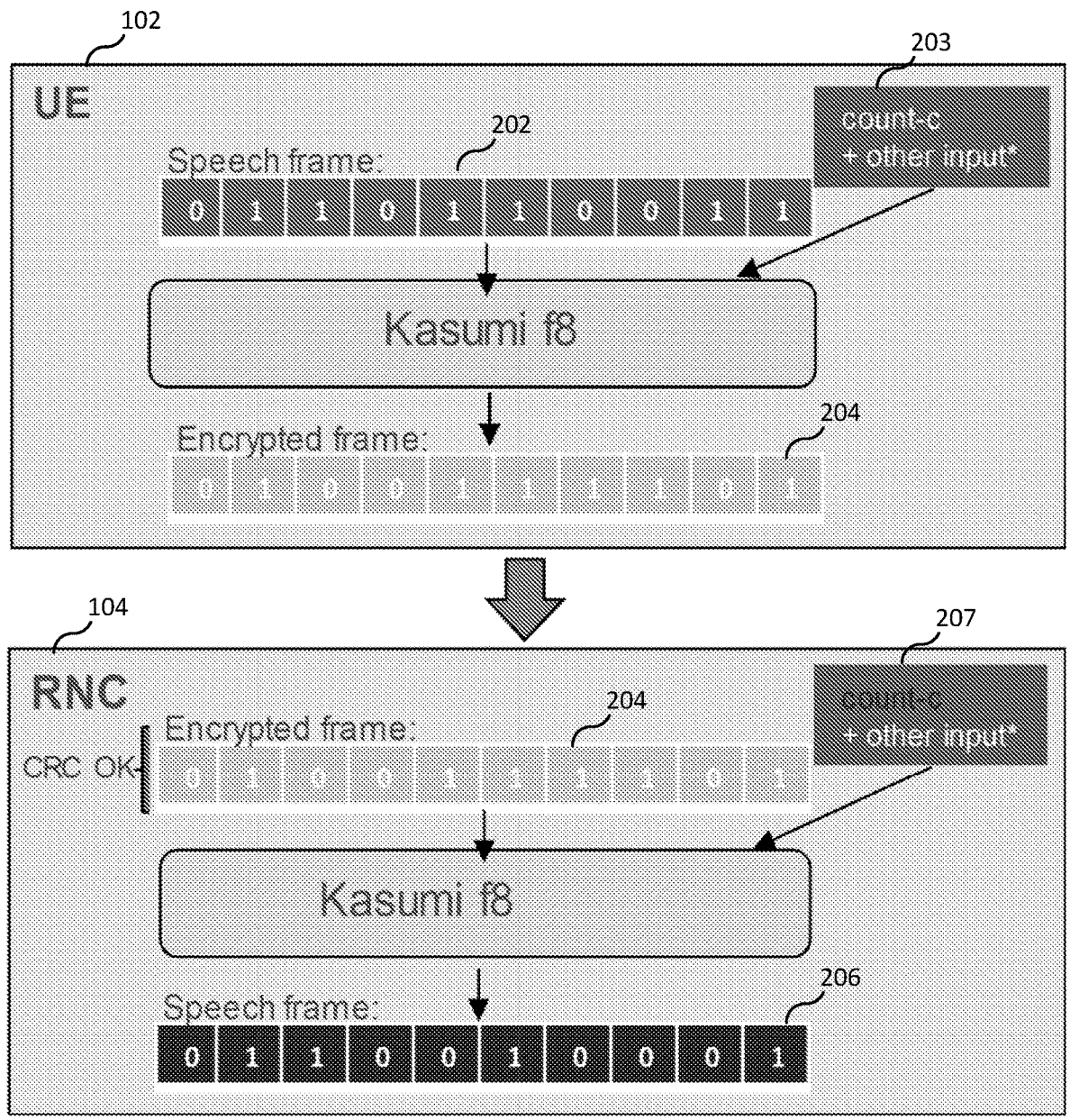
FIG. 2 illustrates a UE transmitting an encrypted speech frame to a network node.
Figure 3:
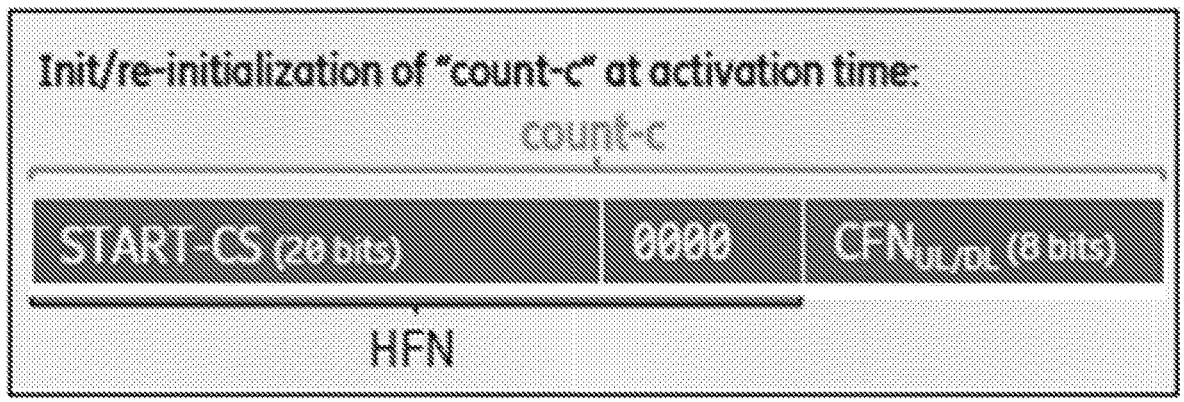
FIG. 3 illustrates a ciphering parameter.

FIG. 2 shows UE 102 generating an encoded speech frame 202 (e.g., an AMR speech frame) and ciphering the speech frame 202 using ciphering parameters 203 and a ciphering algorithm (e.g., Kasumi) to produce a ciphered speech frame 204. The ciphering parameters include a counter (count-c) as well as other parameters, such as an encryption key. UE 102 transmits ciphered speech frame 204 to network node 104 (which in this example is an RNC). FIG. 3 illustrates the count-c input ciphering parameter. As shown in FIG. 3, count-c comprises i) a 24 bit HFN part that consists of a 20 bit START-CS part and 4 other bits and ii) an 8 bit CFN part.

Network node 104 uses its own ciphering parameters 207 to decipher ciphered speech frame 204 to produce a deciphered speech frame 206. In order for network node 104 to successfully decipher speech frame 204 (i.e., in order for speech frame 206 to be identical to speech frame 202), network node 104's cipher parameters 207 must match UE 102's cipher parameters 203. That is, for example, the counter (count-c) used by network node 104 to decipher ciphered speech frame 204 must be equal to the counter that was used by UE 102 to produce ciphered speech frame 204. In this example, the counter used by network node 104 is different than the counter used by UE 102. Thus, in this example, a GS condition exists. It is advantageous to detect such a GS condition so that network node 104 can take a remedial action (e.g., adjust its counter or trigger a call re-establishment procedure).

To overcome the above described disadvantages associated with the above described modes of detecting a GS condition, this disclosure provides an AI-based approach for GS detection. In the AI-based approach, an AI-based GS detector 190 as shown in FIG. 1 is employed. The GS detector 190 uses at least one ML model 195 that can distinguish between GS and non-Garbled speech with high accuracy (i.e., the GS detector can detect when there is ciphering parameter mismatch between UE 102 and network node 104).

GS detector 190 takes as input an active speech frame (see e.g., speech frame 206), which has passed a CRC check and that has been deciphered by a deciphering unit 192. For example, in one embodiment, GS detector 190 obtains deciphered active speech frame 206 that contains encoded voice-data. The input data (a.k.a., predictors) to ML model 195 are a selected set of information elements (IEs) (i.e., a set of one or more bits) of the deciphered encoded speech frame. The selected IEs are a part of the input parameters to a speech decoder. By using parts of the encoded speech frame there is no need to decode the encoded voice-data contained in the frame. The predictors have been selected after building several models using different sets of predictors, with the aim to reduce the number of predictors while maintaining a high prediction performance and at the same time limiting the size of the ML model. The ML model relies only on active encoded speech frames and do not require silence or SID frames to be generated. The ML model can operate on just one single speech frame, which has been proven to be good enough and reducing the complexity compared to requiring several consecutive frames. While FIG. 1 shows that GS detector 190 includes a single ML model 195, in other embodiments, GS detector 190 includes two or more different ML models. For example, if network node 104 supports two different codecs (e.g., AMR NB and AMR WB), then GS detector may have two ML models, one for AMR NB and one for AMR WB).

In some embodiments, GS detector 190 is activated at the time that a speech bearer has been setup between UE 102 and network node 104. In other embodiments, GS detector 190 is activated at a later point in time. Typically, GS is caused by coverage problems that lead to increased latency for traffic between UE 102 and network node 104, but there are also implementation errors both in the UE and in RAN that may lead to GS As can be seen in FIG. 1, GS detector 190 employs AI-based techniques to assure that a voice path between the two end users (UE 102 and UE 103) is non-Garbled. It is also applicable to calls with more than two users, or for calls where UE 103 is connected to a Public Switched Telephone Network (PSTN). In the embodiment shown, GS detector resides in network node 104, but in other embodiments it may reside elsewhere, such as in in a core network (CN) node, and perform analysis of AMR NB and AMR WB speech frames to detect and ultimately resolve GS. UE 102 is un-aware that a GS condition exists but typically both of the end users will notice the GS condition because it will lead to incomprehensible voice due to ciphering mismatch between UE 102 and network node 104.

Machine Learning (ML)

ML model 195 function as a classifier than can classify an observation (i.e., a set of predictors) as indicating either GS or non-Garbled speech. ML model 195 was trained offline using supervised learning. In one embodiment, ML model 195 is based on either Random Forest or on Neural Networks, with equally good performance. In one embodiment, ML 195 was trained offline by using tool that can change the UE behavior—then GS and non-Garbled speech can be generated for the same audio files, which is used for training and testing of the ML models.

The input data (or predictors) to the model are IEs directly taken from the encoded speech frame. No decoding of the speech frame is necessary and there is no dependency to previous speech frames, as required when decoding the speech frames with a Vocoder.

For AMR NB speech frame, the analysis is based on a 12.2 speech frame using seven predictors (seven IEs), which are indicated in Table 1 below. In total 43 bits out of 244 bits overall are used. Each 12.2 speech frame of 20 ms is divided in 4 subframes of approximately 5 ms each. The IEs that make-up the AMR NB 12.2 speech frame are shown in Table 1 below, which also identifies which of the IEs are used as the predictors.

TABLE 1

AMR NB 12.2 Encoded Speech Frame

| Predictors | IEs (Bits (MSB-LSB)) | Description |
|---|---|---|
| X | s1-s7 | index of $1^{st}$ LSF submatrix |
| X | s8-s15 | index of $2^{nd}$ LSF submatrix |
| X | s16-s23 | index of $3^{rd}$ LSF submatrix |
|  | s24 | sign of $3^{rd}$ LSF submatrix |
|  | s25-s32 | index of $4^{th}$ LSF submatrix |
|  | s33-s38 | index of $5^{th}$ LSF submatrix |
|  | subframe 1 | |
|  | s39-s47 | adaptive codebook index |
|  | s48-s51 | adaptive codebook gain |
|  | s52 | sign information for $1^{st}$ and $6^{th}$ pulses |
|  | s53-s55 | position of $1^{st}$ pulse |
|  | s56 | sign information for $2^{nd}$ and $7^{th}$ pulses |
|  | s57 s59 | position of $2^{nd}$ pulse |
|  | s60 | sign information for $3^{rd}$ and $8^{th}$ pulses |
|  | s61-s63 | position of $3^{rd}$ pulse |
|  | s64 | sign information for $4^{th}$ and $9^{th}$ pulses |
|  | s65-s67 | position of $4^{th}$ pulse |
|  | s68 | sign information for $5^{th}$ and $10^{th}$ pulses |
|  | s69-s71 | position of $5^{th}$ pulse |
|  | s72-s74 | position of $6^{th}$ pulse |
|  | s75-s77 | position of $7^{th}$ pulse |
|  | s78-s80 | position of $8^{th}$ pulse |
|  | s81-s83 | position of $9^{th}$ pulse |
|  | s84-s86 | position of $10^{th}$ pulse |
| X | s87-s91 | fixed codebook gain |
|  | subframe 2 | |
|  | s92-s97 | adaptive codebook index (relative) |
|  | s98-s136 | same description as s48-s86 |
| X | s137-s141 | fixed code book gain |
|  | subframe 3 | |
|  | s142-s189 | same description as s39-s91 |
| X | s190-s194 | fixed code book gain |
|  | subframe 4 | |
|  | s195-s439 | same description as s92-s141 |
| X | s440-s444 | fixed code book gain |

As shown in Table 1 above, the seven predictors consist of: three line spectral frequency (LSF) indexes and four fixed code book gains (one for each of the four subframes of the speech frame). LSF is a transformation of parameters describing the spectral nature of the speech frame. For 12.2 there are 5 LSF submatrixes but, in one embodiment, only the indexes pointing to the first three are used as predictors. Fixed codebook gain is a gain factor applied to the fixed codebook.

The performance for the ML model for AMR NB 12.2 frames is shown in Table 2 below:

TABLE 2

| ML performance for one frame | AMR NB |
|---|---|
| True positive: P (gs\| GS) | 0.96 |
| False positive: P (gs\| not GS) | 0.11 |
| True negative: P (not gs\| not GS) | 0.89 |
| False negative: P (not gs\| GS) | 0.04 |

For AMR WB, the analysis is based on a 12.65 speech frame using seven predictors, as shown in Table 3. In total, 45 bits out of 253 bits overall is used. The seven predictors are part of the following identified groups, where each 12.65 speech frame of 20 ms is divided in 4 subframes of approximately 5 ms each. The IEs that make-up the AMR WB 12.65 speech frame are shown in Table 3 below, which also identifies which of the IEs are used as the predictors.

TABLE 3

AMR WB 12.65 Encoded Speech Frame

| Predictors | Bits (MSB-LSB) | Description |
|---|---|---|
| X | s1 | VAD-flag |
| X | s4-s9 | index of 1st ISP subvector |
| X | s10-s17 | index of 2nd ISP subvector |
|  | s18-s43 | index of 3rd ISP subvector |
|  | s44-s30 | index of 4th ISP subvector |
|  | s31-s37 | index of 5th ISP subvector |
|  | s38-s42 | index of 6th ISP subvector |
|  | s43-s47 | index of 7th ISP subvector |
|  | subframe 1 | |
|  | s48-s56 | adaptive codebook index |
|  | s57 | Long-Term-Predictor-filtering-flag |
|  | s58-s93 | Codebook index for tracks 1-4 |
| X | s94-s100 | Vector Quantization (VQ) gain |
|  | subframe 2 | |
|  | s101-s106 | adaptive codebook index (relative) |
|  | s107-s143 | same description as s57-s93 |
| X | s144-s150 | VQ gain |
|  | subframe 3 | |
|  | s151-s196 | same description as s48-s93 |
| X | s197-s203 | VQ gain |
|  | subframe 4 | |
|  | s204-s246 | same description as s101-s143 |
| X | s247-s253 | VQ gain |

As shown in Table 3 above, the seven predictors consist of: the 1 bit Voice Activity Detection (VAD) flag, the index of the 1st Immittance Spectral Pair (ISP) subvector, the index of the 2nd ISP subvector, and four VQ gain values (one for each of the four subframes of the speech frame). The VAD flag indicates whether there is speech or silence in the frame. When the VAD has detected silence for seven frames in a row the transmitter normally starts sending SID frames. Immittance Spectral Pair (ISP) is a transformation of parameters describing the spectral nature of the speech frame. For 12.65 there are 7 ISP subvectors, but in this embodiment only the indexes pointing to the of the first two subvectors are included in the set of predictors. The VQ Gain is a vector quantized combination of the adaptive codebook gain (pitch gain) and the fixed (algebraic) codebook gain. A table lookup is done in the model to extract the fixed codebook gain which is used in the model.

The performance for the ML model for AMR WB 12.65 frames is shown in Table 4 below:

TABLE 4

| ML performance for one frame | AMR WB |
| --- | --- |
| True positive: P (gs\| GS) | 0.91 |
| False positive: P (gs\| not GS) | 0.13 |
| True negative: P (not gs\| not GS) | 0.87 |
| False negative: P (not gs\| GS) | 0.09 |

Even though the ML models perform well, the low likelihood of a speech frame being garbled is problematic and to achieve good performance this needs to be compensated. In one embodiment, four different actions are taken to achieve good performance.

First, GS detector 190 is only activated in relation to the most likely events that cause GS and the GS detector 190 remains active only for a limited, specified amount of time. In this way, the probability for the analyzed speech frames to be garbled is increased.

Second, GS detector 190 is configured such that it will not declare that a GS condition exists until the ML model considers a certain number of consecutive speech frames to be garbled within the specified time frame. In this way the number of false detections can be reduced.

Third, the GS detector employs an HFN correction mechanism and the GS detector will not employ the HFN correction mechanism unless the ML model does not detect GS when deciphering the old detected frames using the corrected HFN value.

Fourth, for falsely detected GS frames there is a small dependency between them, i.e. if the first frame is falsely detected as garbled, then the probability of the second one to be so is increased. This is valid up to a certain number of frames. To compensate for this, the GS detector will not initiate a CRE unless GS is declared after a "reshuffling" as described below.

Figure 4:
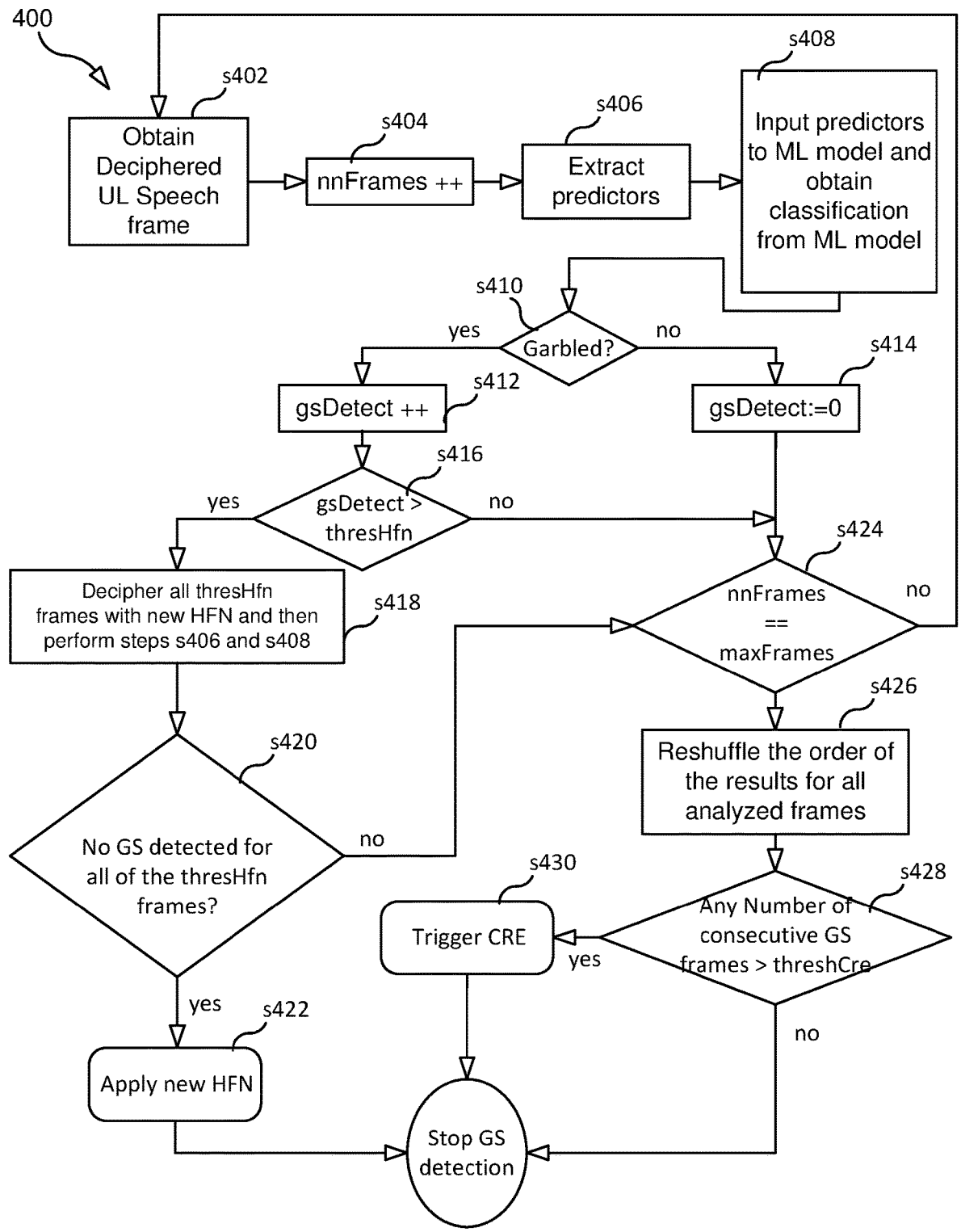
FIG. 4 is a flowchart illustrating a process according to some embodiments.

FIG. 4 is a flow chart illustrating a process 400, according to one embodiment, that is performed by GS detector 190. Process 400 may begin in step s402

Step s402 comprises GS detector 190 obtaining a deciphered UL active speech frame (i.e. an active speech frame transmitted by UE 102) that was deciphered using a parameter (e.g., count-c) that had a particular value.

Step s404 comprises GS detector 190 incrementing a counter (nnFrames), which keep track of the number of active frames that have been processed by GS detector 190. Preferably, nnFrames is set to 0 before process 400 begins.

Step s406 comprises GS detector 190 extracting the predictors from the deciphered speech frame. For example, in the case that the speech frame is an AMR NB 12.2 frame, then in step s406 GS detector extracts the seven IEs mentioned above with respect to Table 1.

Step s408 comprises GS detector 190 inputting the predictors into ML model 195 and then obtaining a GS indicator output by ML model 195, wherein the GS indicator indicates either i) that the ML model has detected GS based on the predictors or ii) that the ML model has not detected GS based on the predictors.

Step s410 comprises GS detector 190 determining whether the GS indicator indicates GS speech has been detected. If GS speech has been detected, then the process proceeds to step s412, where GS detector 190 increments another counter (gsDetect), otherwise the process proceeds to step s414, wherein GS detector 190 sets gsDetect to zero. The gsDetect counter specifies the number of consecutive active speech frames that have tested positive for GS. After step s412, the process proceeds to step s416, and after step s414 the process proceeds to step s424

Step s416 comprises GS detector 190 determining whether gsDetect exceeds a threshold (thresHfn). In one embodiment, thresHfn is equal to five. If gsDetect exceeds the threshold, the process proceeds to step s418, otherwise it proceeds to step s424.

Step s418 comprises GS detector 190 changing the HFN part of count-c to thereby generate a new count-c value and then uses the new count-c value to decipher each one of the thresHfn speech frames that previously tested positive for GS and then performs steps s406 and s408 with respect to these thresHfn speech frames to determine whether ML model indicates that the new count-c value now matches the count-c value that was used by UE 102 to cipher the speech frames.

Step s420 comprises GS detector 190 determining whether all the thresHfn speech frames (which have been deciphered using a new HFN value—the same new or different new HFN values) have tested negative for GS (i.e., GS detector 190 determines whether the ML model 195 did not detect GS for any of the thresHfn speech frames which have been deciphered using the new HFN value(s)). If GS detector 190 determines that all the thresHfn speech frames have tested negative for GS, then a GS condition is declared to exist and the process proceeds to step s422, otherwise the process proceeds to step s424.

Step s422 comprises network node 104 applying the new count-c value to decipher a newly arriving speech frame because it now has been determined that the new count-c value is in synchronization with the count-c value used by UE 102.

Step s424 comprises GS detector 190 determining whether the counter nnFrames equals a threshold (maxFrames). In one embodiment, maxFrames=50. If nnFrames does not equal maxFrames, then the process returns to step s402, otherwise the process proceeds to step s426.

Step s426 comprises GS detector 190 obtaining a vector having N elements, where N=maxFrames, and where each element of the vector is a flag indicating whether or not the corresponding received speech frame tested positive for GS. That is, the first element of the vector is first flag (e.g., a 1 bit flag) indicating whether or not the first received speech frame tested positive for GS, the second element of the vector is second flag indicating whether or not the second received speech frame tested positive for GS, the third element of the vector is third flag indicating whether or not the third received speech frame tested positive for GS, etc. Step s426 further comprises GS detector reshuffling the speech frame. For example, assume that maxFrames=50, then, in one embodiment after the reshuffling occurs: the first element of the reshuffled vector is the first flag indicating whether or not the first received speech frame tested positive for GS, the second element of the reshuffled vector is the 25th flag indicating whether or not the 25th received speech frame tested positive for GS, the third element of the reshuffled vector is the 2nd flag indicating whether or not the 2nd received speech frame tested positive for GS, the fourth element of the reshuffled vector is the 26th flag indicating whether or not the 26th received speech frame tested positive for GS, the fifth element of the reshuffled vector is the 3rd flag indicating whether or not the 3rd received speech frame tested positive for GS, the sixth element of the reshuffled vector is the 27th flag indicating whether or not the 27th received speech frame tested positive for GS, etc.

Step s428 comprises GS detector 190 determining whether the reshuffled vector contains at least a threshold number (threshCre) of consecutive flags each of which indicates that the speech frame corresponding to the flag tested positive for GS. If such a consecutive set of threshCre flags is found, then a GS condition is declared and, in one embodiment, the GS detector causes network node 104 to trigger CRE (e.g., the network node 104 ceases power transmission to UE 102 to trigger call re-establishment from the UE, according to reference [5]) and in other embodiments an Inter-frequency Handover or IRAT Handover is triggered (step s430).

As demonstrated by FIG. 4, two different approaches for restoring the voice call are used: 1) change the count-c value (e.g., change the HFN part of the count-c value) to correct GS, where the new count-c value is verified by applying the ML model again, in order to determine that the correction has corrected the GS problem; and 2) reset of the ciphering parameters by triggering Call Re-establishment when GS has been detected and no HFN value to correct it is found. With Call Re-establishment all different causes for GS can be re-solved. The algorithm will be able to detect more than 99.999% of GS and given that the algorithm determines the call to be garbled it is correct in more than 99% of all scenarios.

As noted previously, GS is most typically caused by a too long delay of the UL RRC Acknowledgement message when ciphering parameters for speech is either setup or reset. The RRC message applicable include: "RB Setup Complete", "RB Reconfiguration Complete", "Physical Channel Reconfiguration Complete", "Transport Channel Reconfiguration Complete" and "Handover to UTRAN Complete". The above messages will not always reset the ciphering of speech. The scenarios that are relevant includes: Initial setup of the speech bearer, IRAT Handover (from 2G or 4G, in the last case called SRVCC) of a speech bearer, Inter-frequency Handover and Call Re-establishment.

Figure 5:
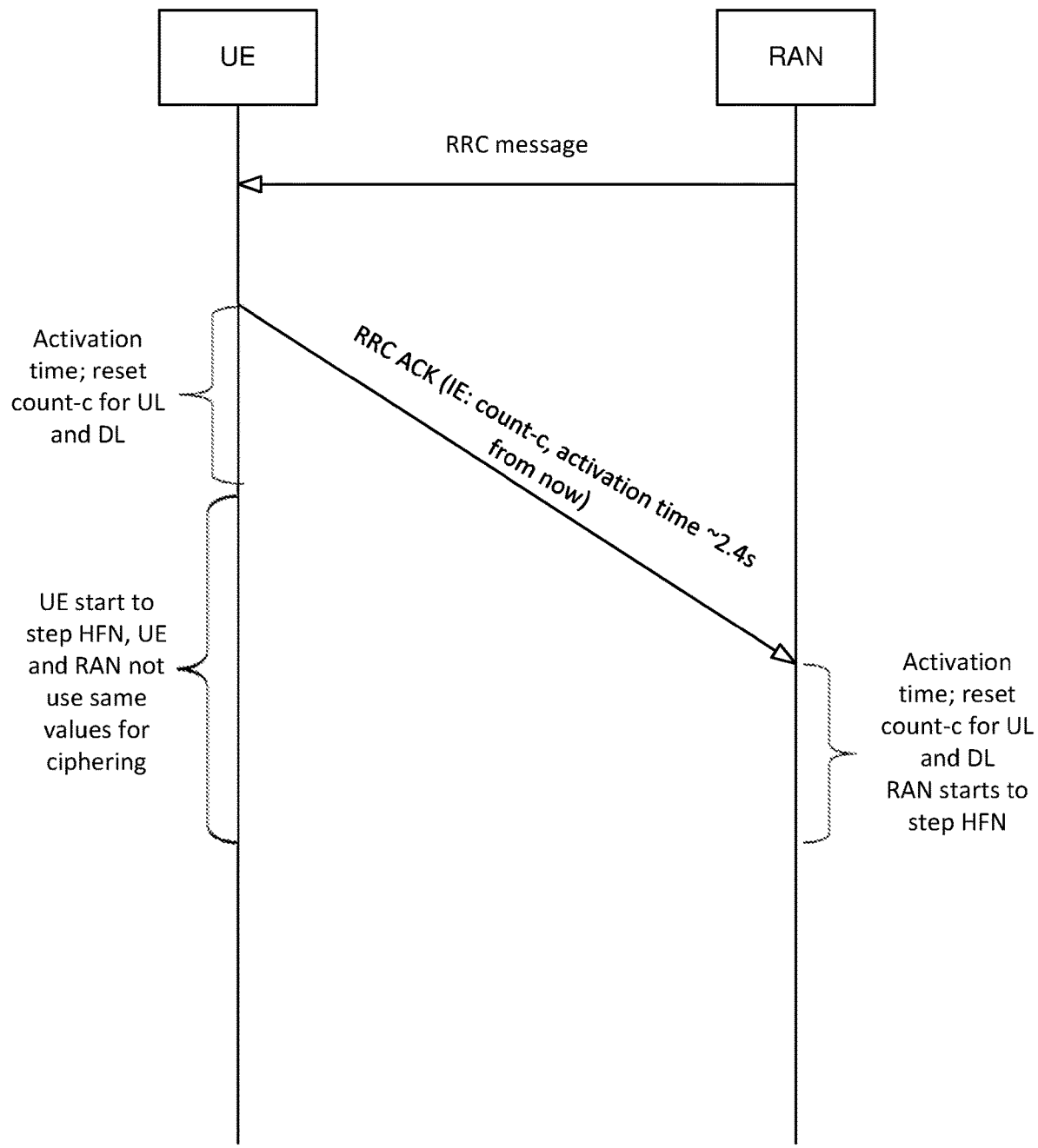
FIG. 5 is an example message flow.

In one embodiment, in order to limit the possibility for false detection, process 400 is only performed after the speech ciphering is initialized or reset, and it is only allowed to run for a limited time period (e.g., as shown in FIG. 4 the process will necessarily end after the GS detector has processed maxFrames). For example, FIG. 5 shows an example of when GS detector 190 is activated. In the example of FIG. 5, GS is caused by a delay in the UL RRC Acknowledgement message (e.g. RB Setup Complete, RB Reconfiguration Complete, Physical Channel Reconfiguration Complete, Transport Channel Reconfiguration Complete, and Handover to UTRAN Complete) reaching network node 104.

Figure 6:
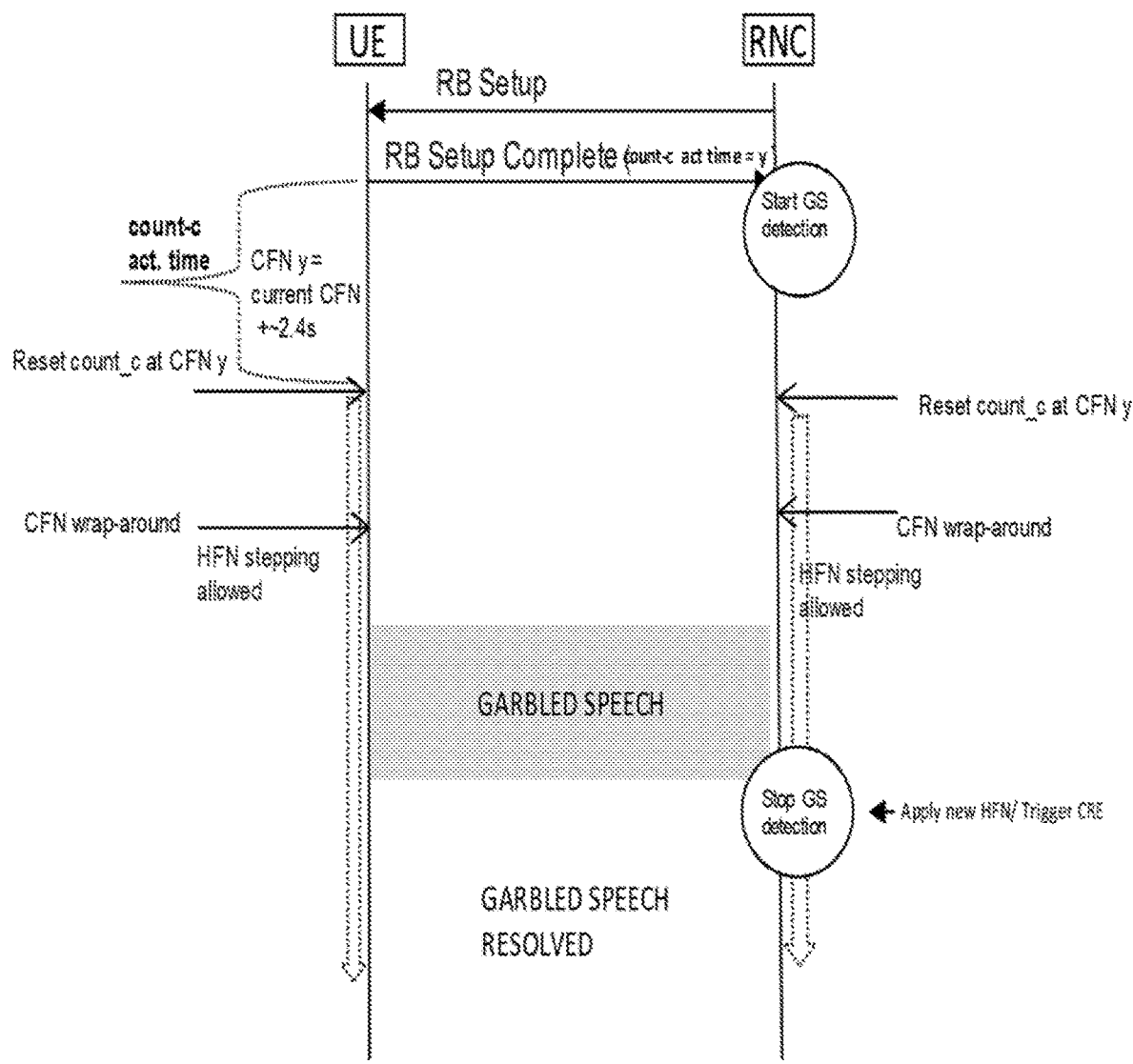
FIG. 6 is another example message flow.

FIG. 6 shows another example of when GS detector 190 is activated. In this example, GS is not caused by the RRC UL delay, but an internal fault in either network node 104 or UE 102, which is causing a mismatch of the ciphering parameters. The example illustrates the scenario when this occurs after an RB Setup Complete message but is applicable for the other RRC messages as well.

There is the possibility that, after GS detector 190 is activated, GS detector 190 will detect no GS. Accordingly, in some embodiments, GS detector is configured to automatically deactivate after a certain condition (e.g., a certain amount of time has elapsed since it was activated or a certain number of speech frames have been processed) and no action is taken. In another embodiment the GS detector is deactivated after a certain number of consecutive speech frames have been received for which the GS detector determines to not be garbled.

Figure 7:
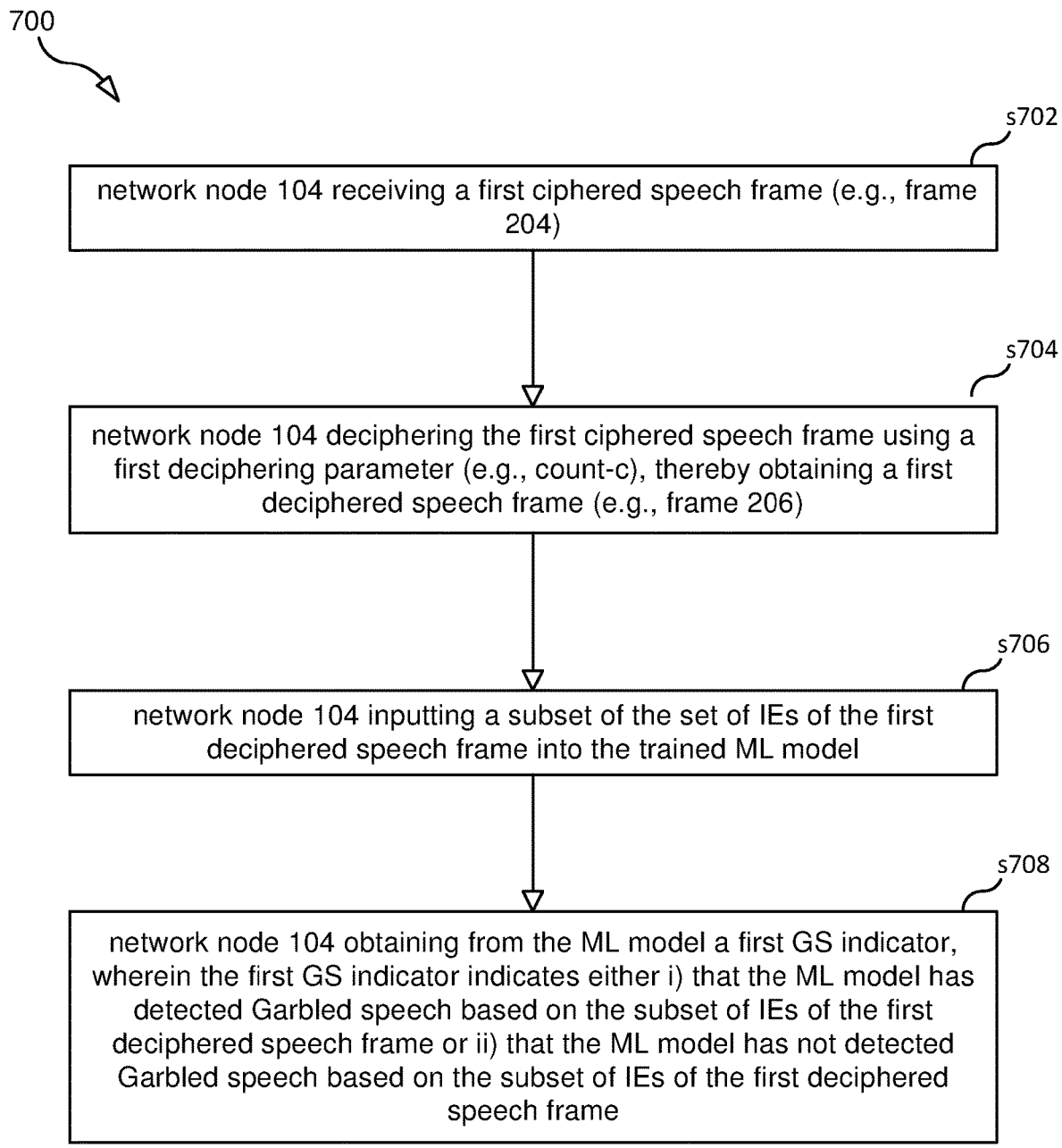
FIG. 7 is a flowchart illustrating a process according to some embodiments.

FIG. 7 is a flowchart illustrating a process 700 performed by network node 104 (e.g., performed by GS detector 190 of network node 104) according to some embodiments. Process 700 may begin in step s702.

Step s702 comprises network node 104 receiving a first ciphered speech frame (e.g., frame 204) comprising first voice-data (e.g., encoded voice data). Step s704 comprises network node 104 deciphering the first ciphered speech frame using a first deciphering parameter (e.g., count-c), thereby obtaining a first deciphered speech frame (e.g., frame 206) comprising the first voice-data, wherein the first deciphered speech frame comprises a set of information elements (IEs), wherein each IE consists of a set of one or more bits. Step s706 comprises network node 104 inputting a subset of the set of IEs of the first deciphered speech frame into the trained ML model 195. In some embodiments, the subset of IEs of the first deciphered speech frame is smaller than the complete set of IEs of the first deciphered speech frame. For example, in some embodiments, the subset of IEs of the first deciphered speech frame consists of not more than seven IEs. Step s708 comprises network node 104 obtaining from the ML model a first GS indicator, wherein the first GS indicator indicates either i) that the ML model has detected GS based on the subset of IEs of the first deciphered speech frame or ii) that the ML model has not detected GS based on the subset of IEs of the first deciphered speech frame.

In some embodiments, process 700 also includes network node 104 determining whether the first GS indicator indicates that the ML model has detected GS based on the subset of IEs of the first deciphered speech frame, and, after determining that the first GS indicator indicates that the ML model has detected GS based on the subset of IEs of the first deciphered speech frame, the network node 104 deciphering the first ciphered speech frame using a second deciphering parameter instead of the first deciphering parameter, thereby obtaining a second deciphered speech frame comprising a set of IEs. The process may further include inputting a subset of the set of IEs of the second deciphered speech frame into the ML model, and obtaining from the ML model a second GS indicator, wherein the second GS indicator indicates either i) that the ML model has detected GS based on the subset of IEs of the second deciphered speech frame or ii) that the ML model has not detected GS based on the subset of IEs of the second deciphered speech frame. In some embodiments, the process further includes incrementing a GS counter (e.g., gsDetect) as a result of determining that the first GS indicator indicates that the ML model has detected GS based on the subset of IEs of the first deciphered speech frame. The GS counter indicates a number of consecutive GS frames. In some embodiments, the process further includes determining, based in part on the value of the GS counter, whether a GS condition exists, e.g., determining whether the GS counter meets or exceeds a threshold (e.g., thresHfn).

In some embodiments, process 700 also includes network node 104 storing a vector comprising N elements, wherein for each one of the N elements, the element corresponds to a different ciphered speech frame that has been received by the network node and indicates whether or not the ML model has detected GS based on the corresponding ciphered speech frame. The process in such an embodiment may further include network node 104 reshuffling the vector to produce a reshuffled vector and determining whether a GS condition exists based on the reshuffled vector. In some embodiments, as a result of determining that the GS condition exists based on the reshuffled vector, network node 104 initiates a procedure for resetting the first deciphering parameter—e.g., network node 104 initiates a handover (e.g., an inter-frequency handover) of the UE.

In some embodiments, process 700 also includes network node 104, based at least in part on a set of GS indicators obtained from the ML model, determining whether or not a GS condition exists. As a result of determining that the GS condition exists, network node 104 may decipher a subsequent ciphered speech frame using an adjusted deciphering parameter.

In some embodiments, the first voice data is encoded voice data and process 700 does not comprise decoding the encoded voice-data.

The overall performance of GS detector 190 is shown in Table 5 below.

TABLE 5

Overall Performance

| | P(GS\| Alg$_{TOT}$ = gs)<br>If algorithm detects<br>Garbled, how likely is it<br>to be correct | P(Alg$_{TOT}$ = gs\| GS)<br>If speech is known to be garbled,<br>how likely will algorithm detect it |
|---|---|---|
| AMR NB | >0.991162134819722 | >0.999991400304436 |
| AMR WB | >0.995772889241784 | >0.994543604547176 |

The above disclosure has described a completely new approach to solve the problem of "Garbled speech." The approach utilizes a ML model to detect GS on a single encoded speech frame (e.g., AMR NB speech frame, AMR WB speech frame) without applying a Vocoder to get the decoded speech data. The approach is valid for all mobile networks (e.g., for 2G/3G CS voice, 4G VoLTE and 5G VoNR) and any codecs (i.e., not just AMR NB or AMR WB Codec).

The ML model works on a selected set of predictors, based on the input parameters to the speech decoder, meaning that there is no need to decode the actual speech frames. The predictors have been selected after building several models using different sets of predictors, with the aim to reduce the number of predictors whilst maintaining a high prediction performance and at the same time limiting the size of the model.

The ML model operates on one single encoded speech frame at a time, which has been proven to be good enough and reducing the complexity, compared to requiring several consecutive frames and their interrelation.

The ML models (both Random Forest and Neural NWs provides good enough properties) have a very good prediction rate (~90-95%), but due to the rare occurrence of GS an advanced algorithm has been developed which compensate for the false negative that may be generated.

Figure 8:
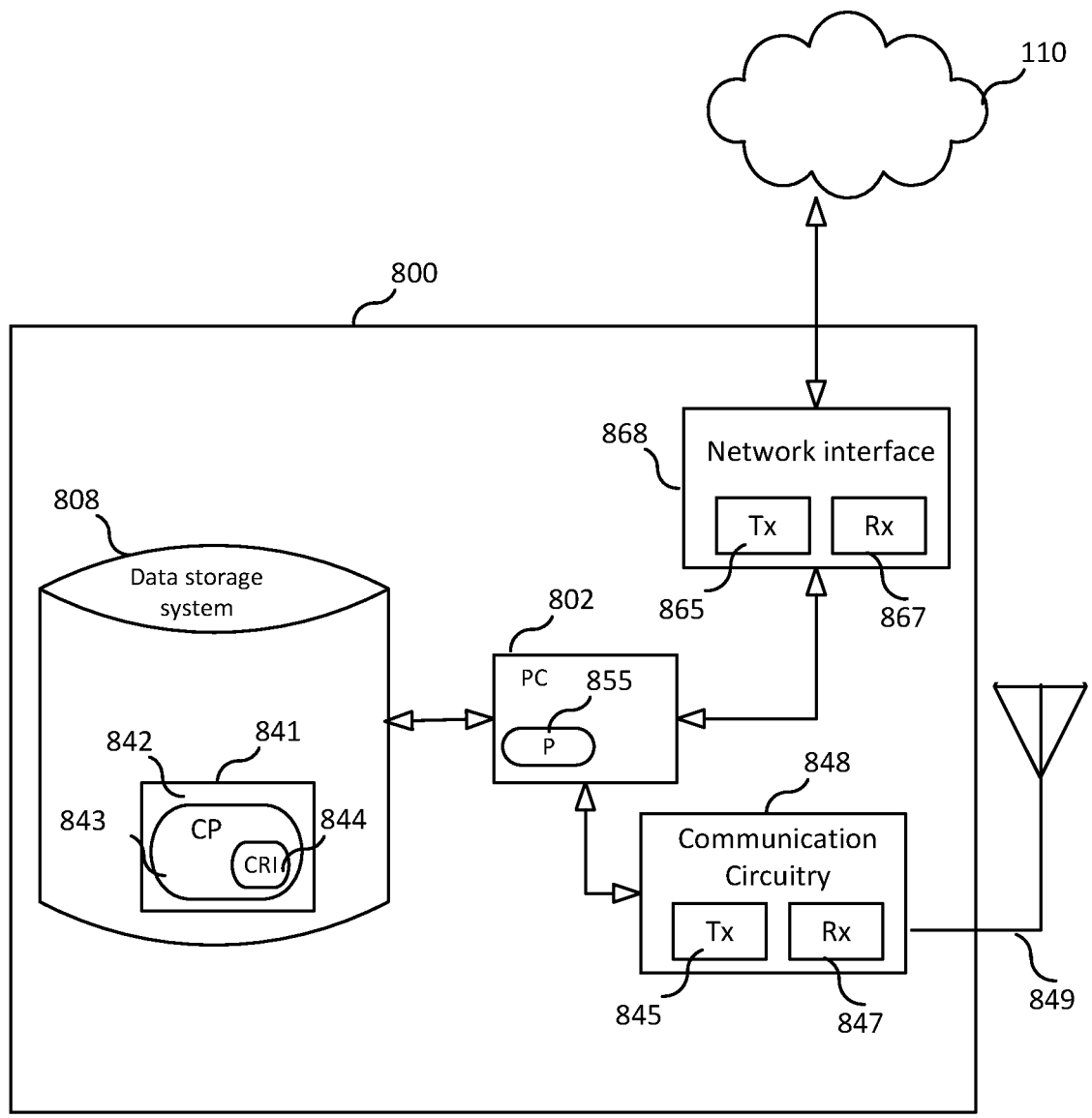
FIG. 8 illustrates a network node according to some embodiments.

FIG. 8 is a block diagram of network node 104, according to some embodiments (e.g., embodiments in which network node 104 is a base station). As shown in FIG. 8, network node 104 comprises: processing circuitry (PC) 802, which includes one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 104 may be a distributed computing apparatus); a network interface 868 comprising a transmitter (Tx) 865 and a receiver (Rx) 867 for enabling network node 104 to transmit data to and receive data from other nodes connected to network 110 (e.g., an Internet Protocol (IP) network) to which network interface 868 is connected; communication circuitry 848, which is coupled to an antenna arrangement 849 comprising one or more antennas and which comprises a transmitter (Tx) 845 and a receiver (Rx) 847 for enabling network node 104 to transmit data and receive data (e.g., wirelessly transmit/receive data); and a local storage unit (a.k.a., "data storage system") 808, which may include one or more non-volatile storage devices and/or one or more volatile storage devices. In embodiments in which network node 104 is not a base station, then network node 104 will not include communication circuitry 848 or antenna arrangement 849. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes network node 104 to perform steps described herein (e.g., steps described herein with reference to the flow charts). In other embodiments, network node 104 may be configured to perform steps described herein without the need for code. That is, for example, PC 802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] 3GPP TS 26.101 Adaptive Multi-Rate (AMR) speech codec frame structure, V15.0.0, 2018-06.
[2] 3GPP TS 26.201 Adaptive Multi-Rate-Wideband (AMR-WB) speech codec; Frame structure, V15.0.0, 2018-06.
[3] 3GPP TS 26.090 Adaptive Multi-Rate (AMR) speech codec; Transcoding functions, V15.0.0, 2018-06.
[4] 3GPP TS 26.190 Adaptive Multi-Rate-Wideband (AMR-WB) speech codec; Transcoding functions, V15.0.0, 2018-06.
[5] 3GPP TS 25.331 Radio Resource Control (RRC); Protocol specification, V15.4.0, 2018-09.

The invention claimed is:

1. A method for processing at least one speech frame, the method being performed by a network node and comprising:

receiving a first ciphered speech frame comprising first voice-data, wherein the first voice-data comprises encoded voice data;

deciphering the first ciphered speech frame using a first deciphering parameter, thereby obtaining a first deciphered speech frame comprising the first voice-data, wherein the first deciphered speech frame is an encoded speech frame and comprises a set of information elements (IEs), wherein each IE consists of a set of one or more bits;

inputting a subset of the set of IEs of the first deciphered speech frame into a trained machine learning (ML) model, wherein the ML model was trained offline using supervised learning, and the ML model was trained using a first version of an audio file comprising GS and a second version of the audio file not comprising GS;

obtaining from the ML model a first garbled speech (GS) indicator, wherein the first GS indicator indicates either i) that the ML model has detected GS based on the subset of IEs of the first deciphered speech frame or ii) that the ML model has not detected GS based on the subset of IEs of the first deciphered speech frame;

determining whether the first GS indicator indicates that the ML model has detected GS based on the subset of IEs of the first deciphered speech frame; and after determining that the first GS indicator indicates that the ML model has detected GS based on the subset of IEs of the first deciphered speech frame, deciphering the first ciphered speech frame using a second deciphering parameter instead of the first deciphering parameter, thereby obtaining a second deciphered speech frame comprising a set of IEs.

2. The method of claim 1, further comprising:
inputting a subset of the set of IEs of the second deciphered speech frame into the ML model; and
obtaining from the ML model a second GS indicator, wherein the second GS indicator indicates either i) that the ML model has detected GS based on the subset of IEs of the second deciphered speech frame or ii) that the ML model has not detected GS based on the subset of IEs of the second deciphered speech frame.

3. The method of claim 2, further comprising incrementing a GS counter as a result of determining that the first GS indicator indicates that the ML model has detected GS based on the subset of IEs of the first deciphered speech frame.

4. The method of claim 3, further comprising determining, based in part on the value of the GS counter, whether a GS condition exists.

5. The method of claim 4, wherein
determining whether the GS condition exists comprises determining whether the GS counter meets or exceeds a threshold, and
the GS counter indicates a number of consecutive GS frames.

6. The method of claim 5, further comprising:
for each of said consecutive GS frames, deciphering the ciphered speech frame corresponding to the GS speech frame using a new deciphering parameter to generate a new deciphered speech frame;
using the ML model to determine whether any of the new deciphered speech frames tests positive for GS; and
applying the new deciphering parameter as a result of determining that none of the new deciphered speech frames has tested positive for GS, thereby resolving a GS condition.

7. The method of claim 1, further comprising:
storing a vector comprising N elements, wherein for each one of the N elements, the element corresponds to a different ciphered speech frame that has been received by the network node and indicates whether or not the ML model has detected GS based on the corresponding ciphered speech frame;
reshuffling the vector to produce a reshuffled vector; and
determining whether a GS condition exists based on the reshuffled vector.

8. The method of claim 7, further comprising, as a result of determining that the GS condition exists based on the reshuffled vector, initiating a procedure for resetting the first deciphering parameter.

9. The method of claim 8, wherein initiating the procedure for resetting the first deciphering parameter comprises initiating a handover of the UE.

10. The method of claim 1, wherein the subset of IEs of the first deciphered speech frame is smaller than the complete set of IEs of the first deciphered speech frame.

11. The method of claim 9, wherein the subset of IEs of the first deciphered speech frame consists of not more than seven IEs.

12. The method of claim 1, wherein
the method does not comprise decoding the encoded voice-data.

13. A non-transitory computer readable storage medium storing a computer program comprising instructions which, when executed by processing circuitry of a network node, causes the network node to perform the method of claim 1.

14. A method for processing at least one speech frame, the method being performed by a network node and comprising:
receiving a first ciphered speech frame comprising first voice-data, wherein the first voice-data comprises encoded voice data;
deciphering the first ciphered speech frame using a first deciphering parameter, thereby obtaining a first deciphered speech frame comprising the first voice-data, wherein the first deciphered speech frame is an encoded speech frame and comprises a set of information elements (IEs), wherein each IE consists of a set of one or more bits;
inputting a subset of the set of IEs of the first deciphered speech frame into a trained machine learning (ML) model, wherein the ML model was trained offline using supervised learning, and the ML model was trained using a first version of an audio file comprising GS and a second version of the audio file not comprising GS;
obtaining from the ML model a first garbled speech (GS) indicator, wherein the first GS indicator indicates either i) that the ML model has detected GS based on the subset of IEs of the first deciphered speech frame or ii) that the ML model has not detected GS based on the subset of IEs of the first deciphered speech frame;
determining whether the first GS indicator indicates that the ML model has detected GS based on the subset of IEs of the first deciphered speech frame;
after determining that the first GS indicator indicates that the ML model has detected GS based on the subset of IEs of the first deciphered speech frame, deciphering the first ciphered speech frame using a second deciphering parameter instead of the first deciphering parameter, thereby obtaining a second deciphered speech frame comprising a set of IEs;
based at least in part on a set of two or more GS indicators obtained from the ML model, determining whether or not a GS condition exists; and as a result of determining that the GS condition exists, deciphering a subsequent ciphered speech frame using an adjusted deciphering parameter.

15. A network node for processing at least one speech frame, the network node comprising:
- a receiver for receiving a first ciphered speech frame comprising first voice-data, wherein the first voice-data comprises encoded voice data; and
- processing circuitry programmed to cause the network node to perform a process that comprises:
- deciphering the first ciphered speech frame using a first deciphering parameter, thereby obtaining a first deciphered speech frame comprising the first voice-data, wherein the first deciphered speech frame is an encoded speech frame and comprises a set of information elements (IEs), wherein each IE consists of a set of one or more bits;
- inputting a subset of the set of IEs of the first deciphered speech frame into a trained machine learning (ML) model, wherein the ML model was trained offline using supervised learning, and the ML model was trained using a first version of an audio file comprising GS and a second version of the audio file not comprising GS;
- obtaining from the ML model a first garbled speech (GS) indicator, wherein the first GS indicator indicates either i) that the ML model has detected GS based on the subset of IEs of the first deciphered speech frame or ii) that the ML model has not detected GS based on the subset of IEs of the first deciphered speech frame;
- determining whether the first GS indicator indicates that the ML model has detected GS based on the subset of IEs of the first deciphered speech frame; and
- after determining that the first GS indicator indicates that the ML model has detected GS based on the subset of IEs of the first deciphered speech frame, deciphering the first ciphered speech frame using a second deciphering parameter instead of the first deciphering parameter, thereby obtaining a second deciphered speech frame comprising a set of IEs.

16. The network node of claim 15, wherein the process further comprises:
- inputting a subset of the set of IEs of the second deciphered speech frame into the ML model; and
- obtaining from the ML model a second GS indicator, wherein the second GS indicator indicates either i) that the ML model has detected GS based on the subset of IEs of the second deciphered speech frame or ii) that the ML model has not detected GS based on the subset of IEs of the second deciphered speech frame.

17. The network node of claim 16, wherein the process further comprises:
- incrementing a GS counter as a result of determining that the first GS indicator indicates that the ML model has detected GS based on the subset of IEs of the first deciphered speech frame; and
- determining, based in part on the value of the GS counter, whether a GS condition exists.

18. The network node of claim 17, wherein
- determining whether the GS condition exists comprises determining whether the GS counter meets or exceeds a threshold, and
- the GS counter indicates a number of consecutive GS frames.

19. The method of claim 18, wherein the process further comprises:
- for each of said consecutive GS frames, deciphering the ciphered speech frame corresponding to the GS speech frame using a new deciphering parameter to generate a new deciphered speech frame;
- using the ML model to determine whether any of the new deciphered speech frames tests positive for GS; and
- applying the new deciphering parameter as a result of determining that none of the new deciphered speech frames has tested positive for GS, thereby resolving a GS condition.

20. The network node of claim 15, wherein the process further comprises:
- storing a vector comprising N elements, wherein for each one of the N elements, the element corresponds to a different ciphered speech frame that has been received by the network node and indicates whether or not the ML model has detected GS based on the corresponding ciphered speech frame;
- reshuffling the vector to produce a reshuffled vector; and
- determining whether a GS condition exists based on the reshuffled vector.

* * * * *